May 31, 1966 W. H. FISCHER 3,254,186
STORED ENERGY MECHANISM FOR CIRCUIT BREAKERS
Filed Dec. 10, 1963 7 Sheets-Sheet 1

May 31, 1966  W. H. FISCHER  3,254,186
STORED ENERGY MECHANISM FOR CIRCUIT BREAKERS
Filed Dec. 10, 1963  7 Sheets-Sheet 6

Fig. 6.

United States Patent Office 3,254,186
Patented May 31, 1966

3,254,186
STORED ENERGY MECHANISM FOR CIRCUIT BREAKERS
William H. Fischer, Penn Hills, Pa., assignor to Westinghouse Electric Corporation, East Pittsburgh, Pa., a corporation of Pennsylvania
Filed Dec. 10, 1963, Ser. No. 329,427
8 Claims. (Cl. 200—153)

This invention relates generally to operating mechanisms for circuit breakers and more particularly to operating mechanisms of the stored energy type.

In the past, various operating mechanisms of the stored energy type, which employed a spring as the energy storing device have been provided for circuit interrupters or circuit breakers. It has been found that many of the prior operating mechanisms of the above type are not adapted for use with circuit breakers of relatively large size or circuit breakers rated at relatively higher voltages. In U.S. Patent No. 2,644,053, issued June 30, 1953, to Harry J. Lingal and Joseph D. Findley, Jr., and in copending application Serial No. 215,854, filed August 9, 1962, by Russell E. Frink and Paul Olsson, and issued May 11, 1965, as U.S. Patent No. 3,183,332, which are both assigned to the assignee of the present application, there are disclosed operating mechanisms of the stored energy type which are particularly adapted for use with circuit breakers of a relatively large size or rated at relatively higher voltages and which possess several important advantages when applied therewith. It is therefore desirable to provide an improved operating mechanism of the storage energy type for circuit breakers of relatively large size which offers all of the advantages of the operating mechanisms just mentioned, as well as several additional advantages.

It is an object of this invention to provide a new and improved trip-free operating mechanism for circuit breakers.

Another object of this invention is to provide an improved operating mechanism of the stored energy type for circuit breakers.

A further object of this invention is to provide an improved operating mechanism of the stored energy type for circuit breakers in which the energy may be stored by either electrically operated means or by manually operated means.

Other objects of the invention will, in part, be obvious and will, in part, appear hereinafter.

For a fuller understanding of the nature and objects of the invention, reference should be had to the following detailed description taken in connection with the accompanying drawings in which.

Referring now to the drawings and FIGS. 1, 2, 3 and 5 in particular, there is illustrated in operating mechanism of the stored energy type which is adapted for use with circuit breakers of relatively large size or rated at relatively higher voltages. In general, the operating mechanism comprises a trip-free shaft 24, a plurality of operating levers 32, 34 and 36 disposed on the shaft 24, a tripping latch assembly 100, a toggle linkage 20 which connects the tripping latch assembly 100 to at least one of the operating levers, a closing spring 42, a ratchet mechanism 30 and a motor 52 for charging the closing spring 42 through a crankshaft 28, a closing latch assembly 100 for releasably retaining the closing spring 42 in a charged condition, and a cam 50 disposed on the crankshaft 28 for actuating the toggle linkage 20 and the operating levers 32, 34 and 36 in response to the discharge of the spring 42 and for maintaining the toggle linkage in an extended condition while the operating mechanism is in the closed circuit position and the closing spring 42 is being charged.

Figure 1:
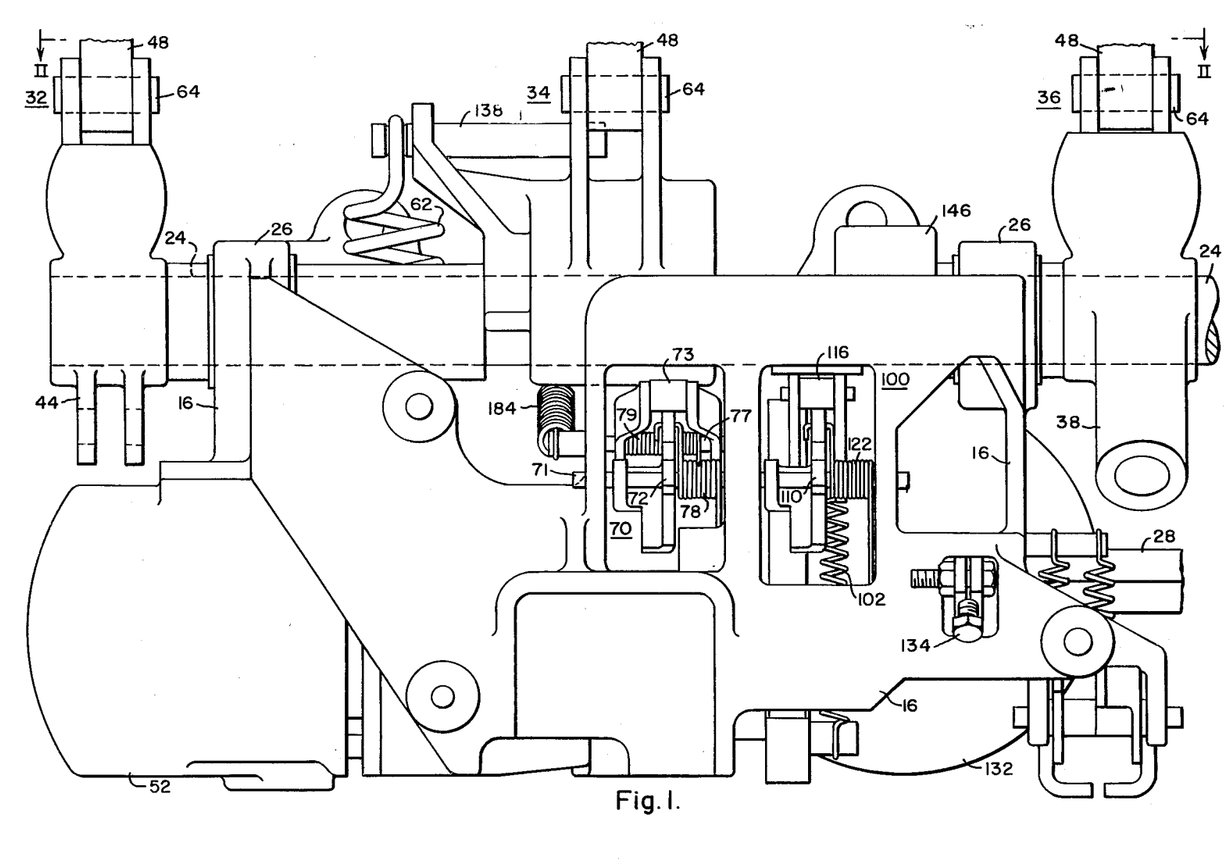
FIGURE 1 is a view in front elevation of a circuit breaker operating mechanism embodying the principal features of the invention.
Figure 2:
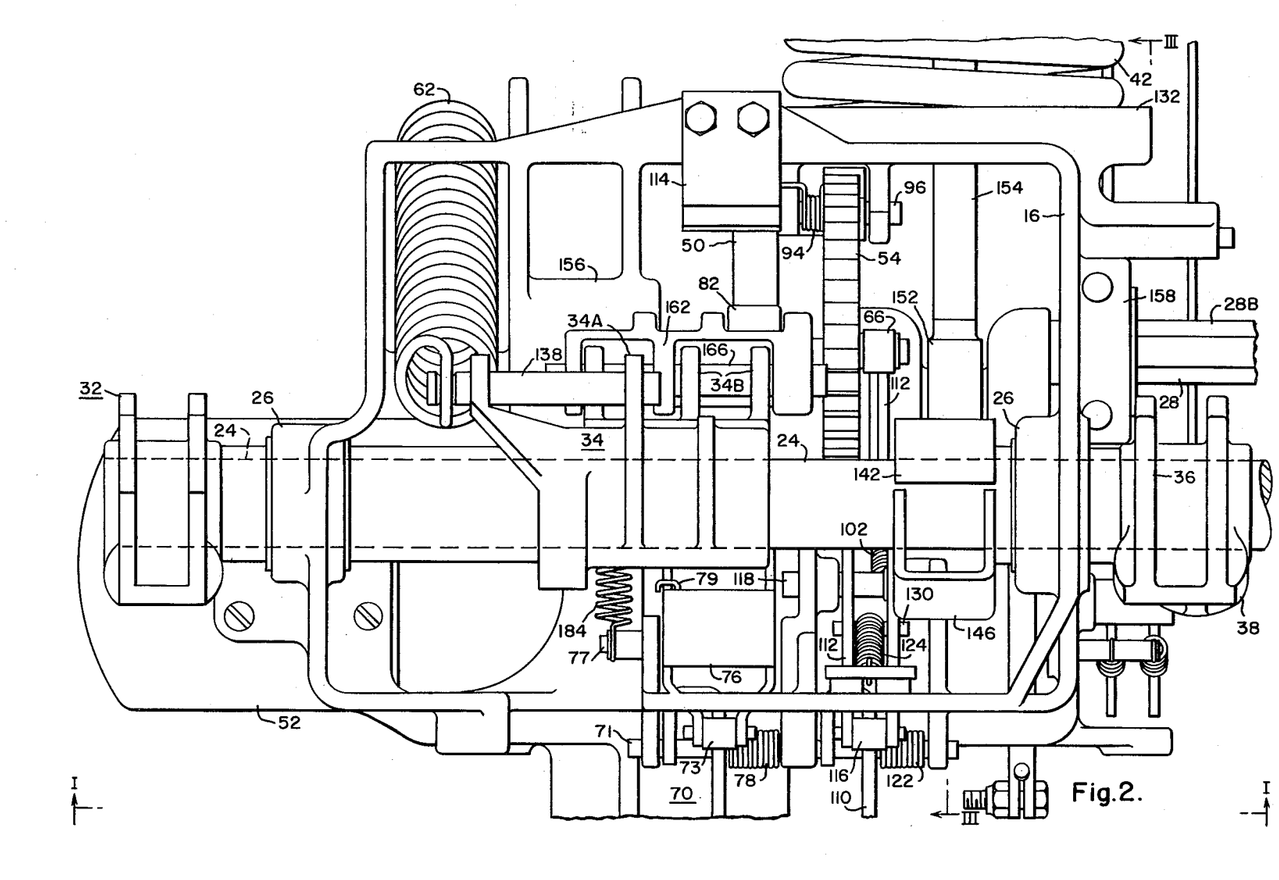
FIG. 2 is a top plan view of the operating mechanism shown in FIG. 1.

More specifically the operating mechanism, as best shown in FIGS. 1 and 2, is supported by a frame or fixed support member 16 which may be disposed on the frame of the complete circuit breaker (not shown) in which the operating mechanism is employed. The trip-free or main operating shaft 24 is rotatably supported by the bearings 26 which in turn are mounted at the opposite ends of the frame 16. The operating levers 32 and 36 are secured or attached to the opposite ends of the shaft 24 for rotation therewith while the operating lever 34 is similarly secured to the intermediate or middle portion of the shaft 24. Each of the operating levers 32, 34 and 36 is pivotally connected to one of the operating members 48 by means of a pin 64. The operating members 48 in turn are coupled or attached to the movable contacts (not shown) of the circuit breaker in which the operating mechanism is employed. As illustrated, the operating lever 32 includes a lower portion 44 which is adapted to receive a pivoted connection to an associated dashpot or damping means (not shown) such as the type disclosed in detail in copending application Serial No. 215,854 previously mentioned, which issued May 11, 1965 as U.S. Patent No. 3,183,332. Such a damping means is usually required to absorb the excess energy stored in the closing spring which is normally sufficient to close the movable contacts at a high speed against a fault or short-circuit condition. The latter energy is in excess of that required in a normal closing operation. The lower portion 44 of the operating lever 32 may be alternatively or additionally coupled or connected to an associated puffer device (not shown) which may be of the general type disclosed in detail in U.S. Patent 3,072,-764, which issued on January 8, 1963, to Russell E. Frink and which is also assigned to the assignee of the present application.

Figure 3:
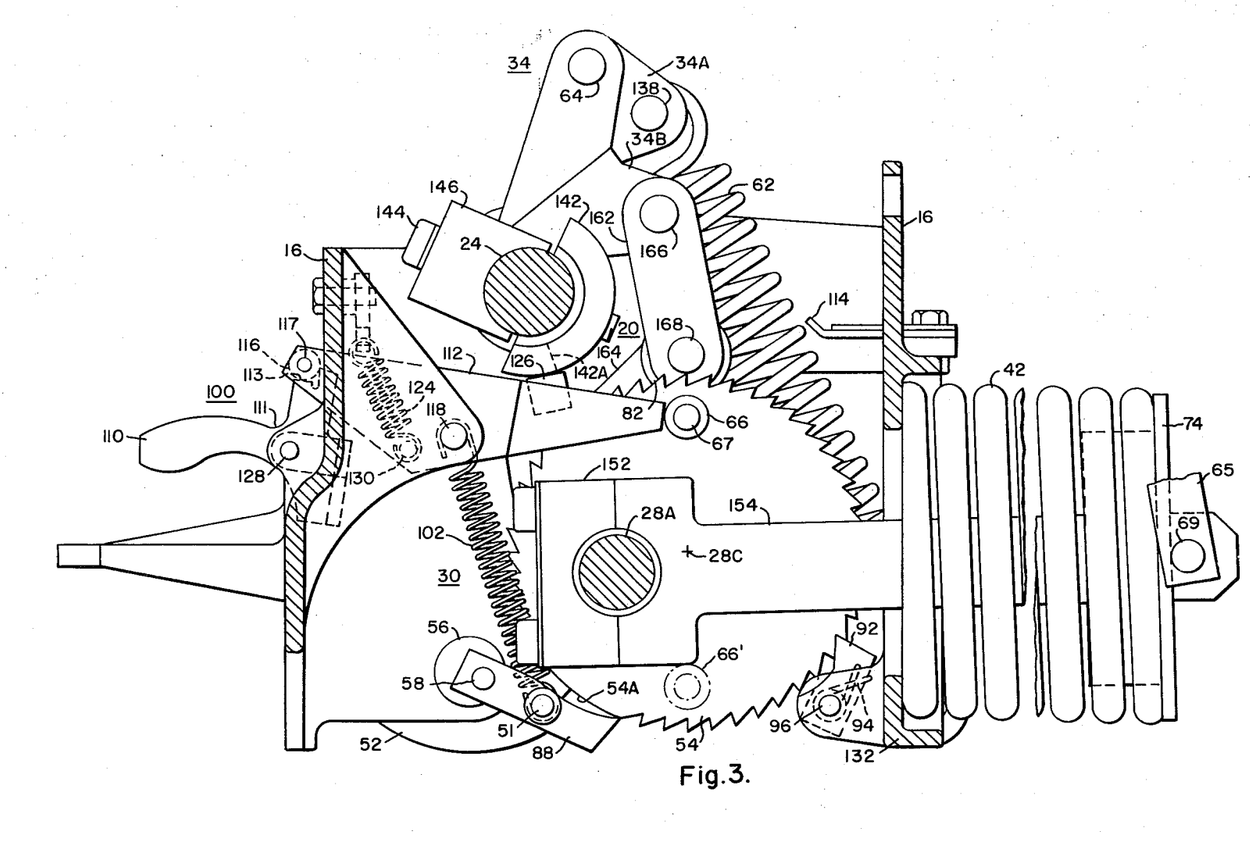
FIG. 3 is a view, partly in right side elevation, and, partly in section, of the operating mechanism shown in FIG. 1 showing the operating mechanism in the closed circuit position with the closing spring charged or loaded.

The closing spring 42 is disposed at the rear of the frame 16, as best shown in FIG. 3, with one end of the closing spring disposed to bear against or engage a spring seat portion 132 provided in the frame 16 and with the other end of the closing spring disposed to engage a spring retainer 74 which in turn is retained on the connecting rod 154 by the pin 69. The connecting rod 154 passes through the closing spring 42 and is supported at one end by the supporting link 65 which is pivotally connected to the rear end of the rod 154 by the pin 69. The other end of the supporting link 65 may be pivotally connected to the frame of the circuit breaker (not shown). The other end of the spring pull rod 154 is pivotally connected to the crank arm or throw 28A of the crankshaft 28 by the coupling member 152 with one end of the rod 154 being shaped to form part of the coupling member 152 which includes a split roller bearing around the crank arm 28A. The crankshaft 28 is rotatably supported by the bearings indicated at 156 and 158, which, in turn, are mounted on the frame 16, as best shown in FIG. 2. The closing spring 42 is compressed between the spring seat 132 and the spring retainer 74 in the fully charged or loaded condition, as shown in FIG. 3. When the crankshaft 28 is released or freed to rotate under the influence of the charged closing spring 42, the crank arm 28A will rotate in a counterclockwise direction about the center of the crankshaft 28, indicated at 28C, to a position angularly displaced by approximately 180° from that shown in FIG. 3 until the closing spring 42 is substantially discharged or unloaded. During the latter rotation of the crank arm 28A and the discharge of the closing spring 42, the rod 154 and the spring retainer 74 will, of course move, generally to the right from their respective positions shown in FIG. 3.

In order to permit charging of the closing spring 42 by the motor 52 through the crankshaft 28, the ratchet mechanism 30 is provided, as shown in FIG. 3. The ratchet mechanism 30 comprises the ratchet wheel 54, the actuating pawl 88 and the retaining or holding pawl 92. The ratchet wheel 54 is secured to or mounted on the crankshaft 28 for rotation therewith adjacent to the coupling member 152, as shown in FIG. 2, and includes a plurality of teeth on a portion of its outer periphery, as well as a smooth portion on its outer periphery as indicated at 54A. The actuating pawl 88 is pivotally connected to the end of the shaft 56 of the motor 52 on a pivot pin 58 which is eccentrically disposed or mounted on the end of the shaft 56. The actuating pawl 88 is biased in a counterclockwise direction about the pivot pin 58 into engagement with the teeth on the ratchet wheel 54 by the tension spring 102 which is connected between a pin 51 mounted on the pawl 88 and a pivot shaft or pin 118 which is mounted or supported on the frame 16. In order to prevent clockwise rotation of the ratchet wheel 54 and the crankshaft 28 as shown in FIG. 3 during the charging of the closing spring 42 by the motor 52, the retaining pawl 92 is rotatably supported on the pivot pin 96, which, in turn, is mounted on the frame 16, and is biased into engagement with the teeth of the ratchet wheel 54 by the torsion spring 94 which is disposed on the pivot pin 96. A pivot pin 67 is also mounted on the ratchet wheel 54 for rotation therewith to rotatably support a roller 66 which cooperates with the closing latch assembly 100, as will be described in detail hereinafter.

During the charging of the closing spring 42 by the motor 52, when the motor 52 is energized and the motor shaft 56 is rotating, the actuating pawl 88 is actuated to move in a reciprocating or oscillating manner because of its eccentric connection to the motor shaft 56. For each revolution of the motor shaft 56, the actuating pawl 88 will move generally to the right as viewed in FIG. 3 to engage one of the teeth on the ratchet wheel 54 and advance the ratchet wheel 54 in a counterclockwise direction one tooth. The ratchet wheel 54 is prevented from rotating in a clockwise direction between successive strokes or movements of the actuating pawl 88 by the retaining pawl 92. The continued rotation of the motor shaft 56 will therefore advance the ratchet wheel 54 and the crank arm 28A in a counterclockwise direction about the center of the crankshaft 28 to move the spring pull rod 154 and the spring retainer 74 generally toward the left, as viewed in FIG. 3, to compress the closing spring to the fully charged condition shown in FIG. 3. When the closing spring 42 is fully charged by the operation of the motor 52 and the ratchet mechanism 30 as just described, the actuating pawl 88 will reach the smooth portion 54A of the ratchet wheel 54 and the motor 52 will run freely until deenergized by the operation of a suitable limit switch (not shown) without attempting to further advance the ratchet wheel 54 in a counterclockwise direction. When the actuating pawl 88 reaches the last tooth on the ratchet wheel 54 prior to the smooth portion 54A of the ratchet wheel 54, the center of the crank arm 28A will reach a position as shown in FIG. 3, just below the center 28C of the crankshaft 28 and the force of the closing spring 42 acting through the crankshaft 28 will cause the roller 66 on the ratchet wheel 54 to bear against one end of the closing latch member 112 which forms part of the closing latch assembly 100.

In order to releasably maintain the closing spring 42 in a fully charged condition as shown in FIG. 3, the closing latch assembly 100 is provided to prevent further counterclockwise rotation of the ratchet wheel 54 and the crank arm 28A after the latter parts reach their respective positions shown in FIG. 3. The closing latch assembly 100 comprises the closing latch member 112 and the closing trigger 110. The closing latch member 112 is rotatably supported on a pivot shaft or pin 118 which in turn is mounted or supported on the frame 16. The closing latch member 112 is biased in a clockwise direction about the pivot pin 118 by the tension spring 124, which is connected between a fixed support on the frame 16 and a pin 120, which is mounted on the closing latch member 112 for rotation therewith. The right end of the closing latch member 112 includes a slightly sloping surface which bears against the roller 66 on the ratchet wheel 54 when the closing spring 42 is being held in a charged condition. The other end of the closing latch member 112 includes a pivot pin 117 mounted thereon on which is rotatably supported a roller 116. In order to prevent counterclockwise rotation of the closing latch member 112 about the pivot pin 118 under the influence of the force exerted by the closing spring 42 through the crankshaft 28 and the ratchet wheel 54 when the closing spring 42 is in the charged condition, said force being sufficient to overcome the biasing force exerted on the closing latch member 112 by the tension spring 124, the releasable closing trigger 110 is rotatably disposed on the pivot pin 128, which, in turn, is mounted on or supported by the frame 16. The closing trigger 110 includes a shoulder or catch portion 113 which engages the roller 116 on the closing latch member 112 to prevent further counterclockwise rotation of the closing latch member 112 about the pivot pin 118 beyond the position shown in FIG. 3. The torsion spring 122 is disposed on the pivot pin 128 as shown in FIG. 2 to bias the closing trigger 110 in a counterclockwise direction about the pivot pin 128 to thereby maintain the catch portion 113 of the closing trigger 110 in engagement with the roller 116 on the closing latch member 112.

In order to release the closing latch assembly 100 and to release the energy stored in the fully charged closing spring 42 as shown in FIG. 3, the closing trigger 110 may be actuated in an upward direction or clockwise direction about the pivot pin 128 by any suitable means, such as the plunger of a closing solenoid (not shown) or by a manually actuated plunger (not shown). When the closing trigger 110 is actuated in a clockwise direction to release the closing latch assembly 100, the roller 116 will roll into the recessed portion 111 of the closing trigger 110 to permit counterclockwise rotation of the closing latch member 112 under the influence of the force exerted by the closing spring 42 through the crankshaft 28 and the roller 66 on the ratchet wheel 54. When the closing trigger 110 is released, the right end of the closing latch member 112 will move in a counterclockwise direction about the pivot pin 118 against the biasing force of the tension spring 124, and the roller 66 on the ratchet wheel 54 will roll off the sloping surface at the right end of the closing latch member 112 until the roller 66 is clear of the closing latch member 112. The ratchet wheel 54 will then rotate rapidly in a counterclockwise direction until the closing spring 42 is substantially discharged. While the closing spring 42 is discharging its energy by driving the crankshaft 28 and the ratchet wheel 54 as just described, the roller 66 will rotate aproximately 180° in a counterclockwise direction about the center of the crankshaft 28 to the position indicated in dotted outline at 66' in FIG. 3, which corresponds to the fully discharged condition of the closing spring 42. Similarly the crank arm 28A will rotate approximately 180° in a counterclockwise direction about the center of the cranksfhaft 28 to a position slightly above the center of the crankshaft 28, while the closing spring 42 is discharging. The manner in which the energy of the closing spring 42 is transmitted to the operating levers 32, 34 and 36 will be described in detail hereinafter. It is to be noted that an interlocking member 126 is mounted on the closing latch member 112 for rotation therewith to be engaged by a cooperating interlocking member 142 which is secured to the trip-free shaft 24 to prevent release of the closing latch assembly 100 when the operating mechanism is in an operating condition which corresponds to the closed circuit condition of the complete circuit breaker in which the operating mechanism is employed. The working surface of the member 142 is designed to disengage from the member 126 when the edge of the working surface indicated at 142A moves past the member 126 during an opening operation of the operating mechanism. The latter interlocking arrangement is provided in order to prevent any unnecessary damage to various parts of the operating mechanism which might otherwise result if the energy in the closing spring 42 were released in attempting to slam home various parts which were already in an operating position corresponding to that of the closed circuit position of the complete circuit breaker in which the operating mechanism is employed.

The toggle linkage or means 20, as best shown in FIGS. 4 through 7, includes the upper toggle links 162 and the lower toggle link 164. The upper ends of the upper toggle links 162 are pivotally connected to the lower projecting portion 34B of the intermediate operating lever 34 by the pivot pin 166 which is supported thereon. The lower ends of the upper toggle links 162 are pivotally connected to the upper end of the lower toggle link 164 by the pivot pin 168 on which is rotatably supported the roller 82 at the knee of the toggle linkage 20 for a purpose which will be explained hereinafter. The lower end of the lower toggle link 164 is pivotally connected to the apex of the generally triangular shaped cam link or member 172, which forms part of the strip latch assembly 70, by the pivot pin 178. The knee of the collapsible toggle linkage 20 at the pivot pin 168 is biased toward the left, as viewed in FIGS. 4 through 7, by the tension spring 184 which is connected between the pivot pin 168 at the knee of the toggle linkage 20 and the pivot pin or shaft 77 which is mounted on or suported by the frame 16 to assist in resetting the trip latch assembly 70, as will be explained hereinafter. In order to bias the toggle linkage 20 towards the collapsed condition shown in FIGS. 5 and 7, in which the roller 82 at the knee of the toggle linkage is moved to the right, and to bias the operating levers 32, 34 and 36 in a clockwise direction about the shaft 24 toward the open circuit position of the complete circuit breaker in which the operating mechanism is employed, the tension spring 62 is provided. In particular, the tension spring 62 is connected between a pin 138 which is mounted on the lower projecting portions 34A of the operating lever 34 and a fixed support (not shown) on the frame 16.

Figure 4:
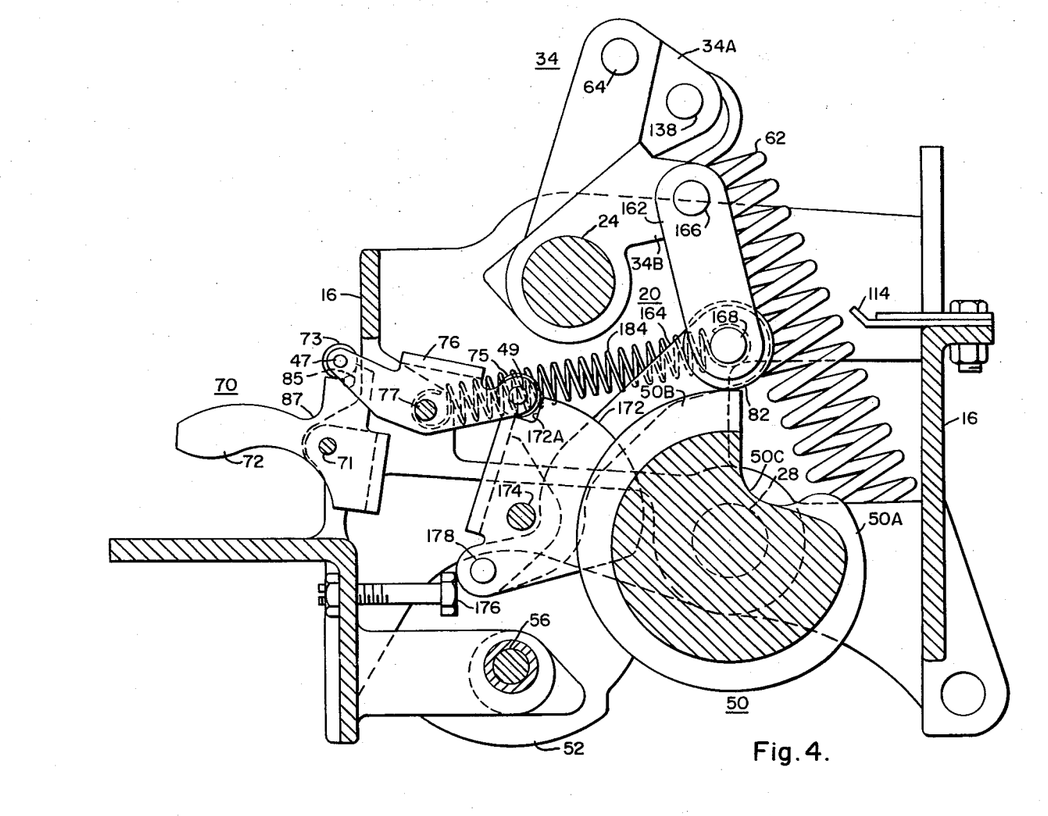
FIG. 4 is a sectional view similar to FIG. 3, but showing the trip latch assembly of the operating mechanism and the associated toggle means when the operating mechanism is in the closed circuit position with the closing spring charged or loaded.
Figure 5:
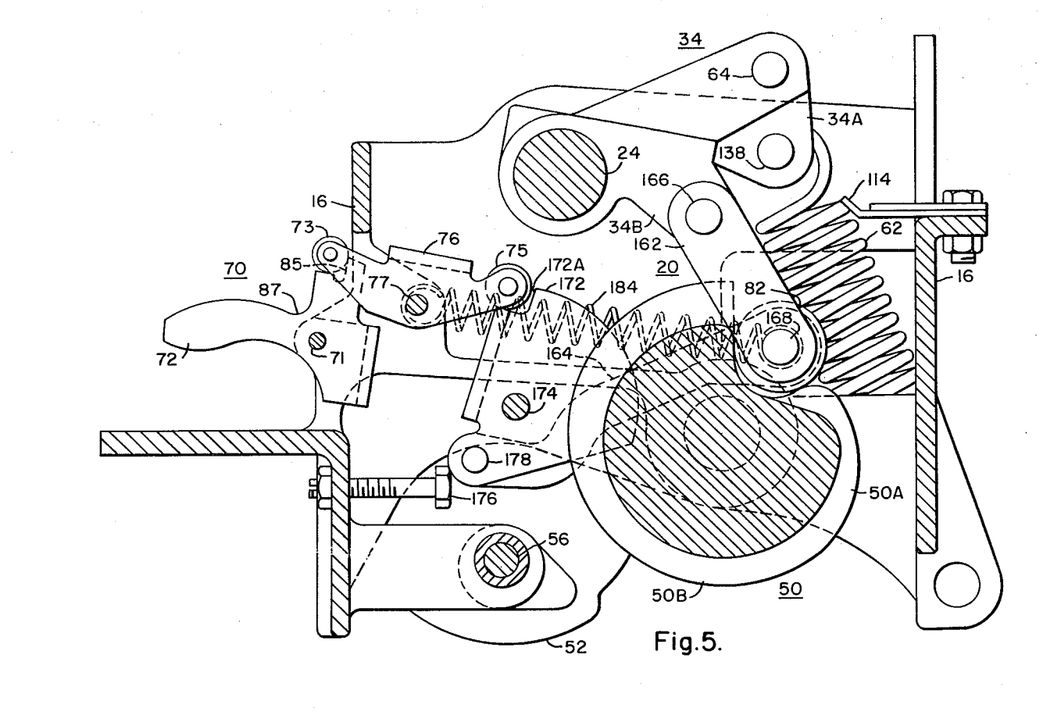
FIG. 5 is a sectional view similar to FIGS. 3 and 4, but showing the operating mechanism in the tripped open position with the closing spring charged or loaded in readiness to close the circuit breaker and with the mechanism in the automatically reset position.
Figure 6:
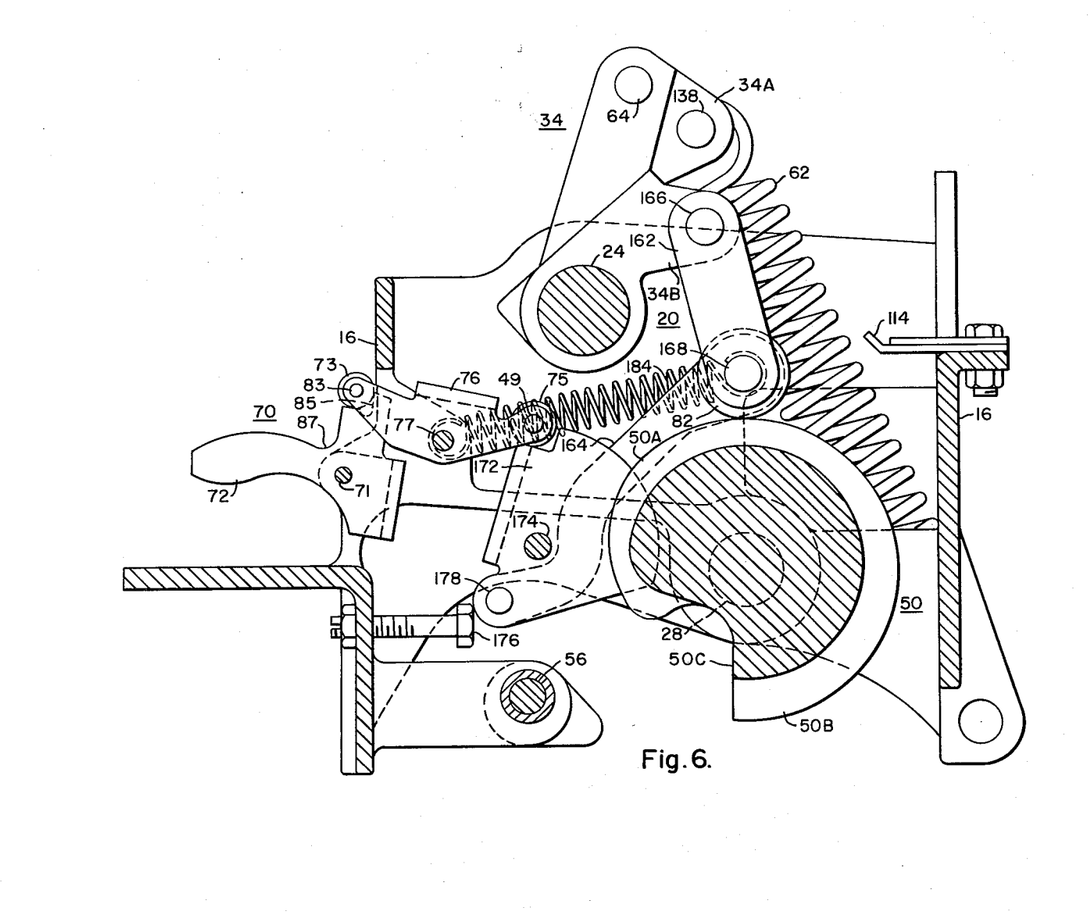
FIG. 6 is a sectional view similar to FIGS. 4 and 5 but showing the operating mechanism in the closed circuit position, with the closing spring discharged or unloaded.

In order to releasably maintain the toggle linkage 20 in a thrust or force transmitting condition, the trip latch assembly 70 is provided. As best shown in FIGS. 4 and 6, the trip latch assembly comprises the cam link 172, the rocker arm 76 and the tripping trigger 72. The cam link 172 is rotatably supported on the pivot pin 174, which in turn is supported on the frame 16, with the lower portion of the cam link 172 being pivotally connected to the lower end of the lower toggle link 164 by the pivot pin 178. In order to limit rotational travel of the cam link 172 about the pivot pin 174 during the resetting of the trip latch assembly 70, the adjustable stop member 176 is disposed or mounted at one side of the frame 16 to bear against the lower portion of the cam link 172, as well as the pivoted connection between said cam link and the toggle link 164, when the trip latch assembly 70 is reset or latched. The rocker arm 76 is rotatably supported on the pivot pin 77, which in turn is supported on the frame 16. The roller 73 is rotatably supported on the pivot pin 47 which is mounted at one end of the rocker arm 76, while the roller 75 is rotatably supported on the pivot pin 49 which is mounted on the other end of the rocker arm 76. In order to bias the rocker arm 76 in a clockwise direction about the pivot pin 77 and to bias the roller 75 on said rocker arm into engagement with a recess or shoulder 172A provided on the cam link 172, when the trip latch assembly 70 is in the latched condition, a torsion spring 79 is disposed on the pivot pin 77, as shown in FIGS. 1 and 2. In order to prevent the left end of the rocker arm 76 from rotating in a counterclockwise direction about the pivot pin 77 under the influence of the force transmitted from the opening spring 62 through the toggle linkage 20 and the cam link 172, the tripping trigger 72 is rotatably mounted on a pivot pin 71, which in turn is supported by the frame 16, and includes a catch or shoulder portion 85 which engages the roller 73 at the left end of the rocker arm 76. The tripping trigger 72 is biased in a counterclockwise direction about the pivot pin 71 by the torsion spring 78 which is disposed on the pivot pin 71, as shown in FIGS. 1 and 2. The tripping trigger 72 also includes a recess 87 which is adapted to receive the roller 73 of the rocker arm 76 when the tripping trigger 72 is actuated in an upward direction or in a clockwise direction about the pivot pin 71 by any suitable means, such as the plunger of a tripping solenoid (not shown) or any manually actuated member which exerts an upward force on the tripping trigger 72, as shown in FIG. 5. When the trip latch assembly 70 is released by actuating the tripping trigger 72, the rocker arm 76 is free to rotate in a counterclockwise direction about the pivot pin 77 and the cam link 172 is similarly free to rotate in a counterclockwise direction about the pivot pin 174.

In order to actuate the toggle linkage 20 to the extended operating condition shown in FIGS. 4 and 6, the cam member 50 is secured to the same crankshaft 28 as the ratchet wheel 54. As shown in FIGS. 4 through 7, the cam member 50 includes a first increasing lobe portion 50A for driving the roller 82 at the knee of the toggle linkage 20 and extending the toggle linkage 20, a second constant radius portion 50B for maintaining the toggle linkage 20 in the extending condition while the closing spring 42 is being charged, and a third recessed portion 50C for permitting the resetting of the trip latch assembly 70 by the resetting spring 184.

Figure 7:
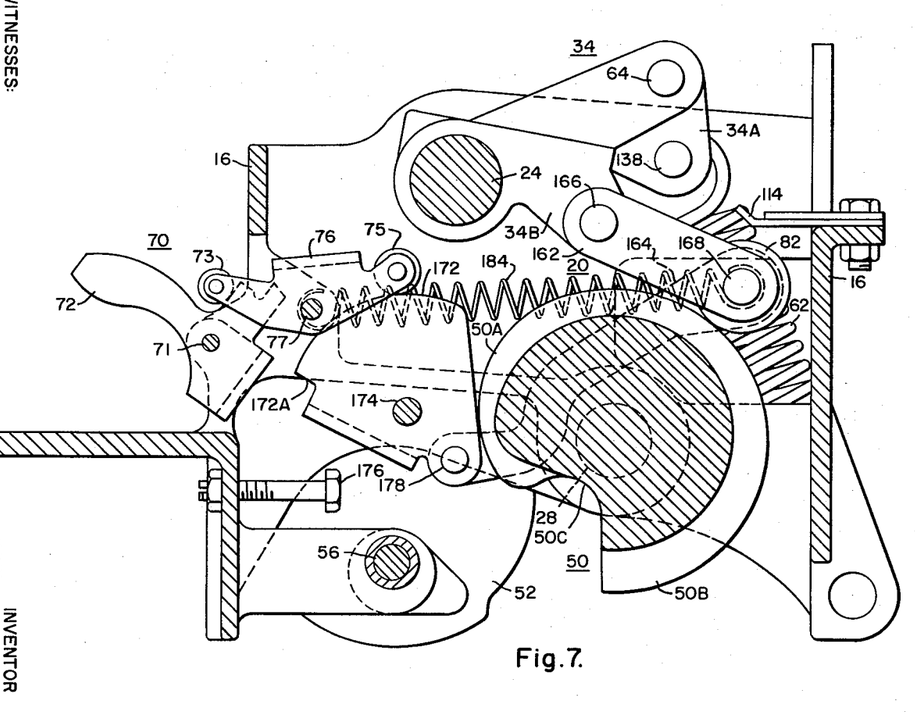
FIG. 7 is a sectional view similar to FIGS. 4, 5 and 6 but showing the operating mechanism in the tripped open position with the closing spring discharged or unloaded and before the mechanism is automatically reset.

In describing the operation of the disclosed operating mechanism, it will be assumed that initially the operating mechanism is in the operating condition corresponding to the open circuit position of the complete circuit breaker in which the operating mechanism is employed and that the closing spring 42 is in the discharged condition, as shown in FIG. 7. It is to be noted that in the initial operating condition shown in FIG. 7, the toggle linkage 20 is in the collapsed condition with the roller 82 at the knee of the toggle linkage 20 moved toward the right side of the frame 16 and with the trip latch assembly 70 in the released condition. It is also to be noted that the trip latch assembly 70 cannot be reset by the resetting spring 184 until the cam member 50 is rotated in a counterclockwise direction about the crankshaft 28 during the charging of the closing spring 42 to the position shown in FIG. 5 in which the recessed portion 50C of the cam member 50 will permit the roller 82 to move to the left under the influence of the resetting spring 184. In order to charge the closing spring 42, the motor 52 is energized to drive the ratchet wheel 54 through the ratchet mechanism 30 as previously described to rotate the roller 66 from the position indicated in phantom at 66′ in FIG. 3 in a counterclockwise direction until the roller 66 engages the closing latch member 112, as shown in FIG. 3. During the latter rotation of the ratchet wheel 54 by the motor 52, the crank arm 28A of the crankshaft 28 will also be driven in a counterclockwise direction from a position displaced approximately 180° from the position shown in FIG. 3 to the final position shown in FIG. 3 to thereby actuate the spring pull rod 154 to the left and compress the closing spring 42 to its fully charged condition. As mentioned previously, when the closing spring is fully charged, the actuating pawl 88 of the ratchet mechanism 30 will engage the smooth portion of the ratchet wheel 54 and the motor 52 will run freely until deenergized by a suitable means such as a limit switch (not shown). While the ratchet wheel 54 is being driven by the motor 52 through the ratchet mechanism 30 to charge the closing spring 42, the cam member 50 which is disposed on the same crankshaft 28 as the ratchet wheel 54 will also be rotated in a counterclockwise direction from the position shown in FIG. 7 to the position shown in FIG. 5 in which the recessed portion 50C of the cam member 50 will permit the roller 82 at the knee of toggle linkage 20 to move toward the left to bear against the recessed portion 50C under the influence of the force exerted by the resetting spring 184. The lower end of he lower toggle link 164 will therefore move generally toward the left to rotate the cam link 172 in a clockwise direction about the pivot pin 174 unil the cam link 172 permits the roller 75 on the rocker arm 76 of the trip latch assembly 70 to drop into the shoulder portion 172A on the cam link 172. When the roller 75 on the rocker arm 76 drops into the shoulder portion 172A of the cam link 172, the rocker arm 76 will rotate in a clockwise direction about the pivot pin 77 and the roller 73 at the other end of the rocker arm 76 will be actuated to engage the shoulder portion 85 of the tripping trigger 72 which is biased in a counterclockwise direction about the pivot pin 71 to thereby reset the trip latch assembly 70. The resetting of the trip latch assembly 70 is necessary before a thrust or force can be transmitted from the closing spring 42, through the crankshaft 28 and the driving cam 50, to extend the toggle linkage 20 and rotate the operating levers 32, 34, and 36 in a counterclockwise direction about the trip-free shaft 24. It is to be noted that when the closing spring 42 is fully charged as just described, the closing latch assembly 100 will be in the latched condition as shown in FIG. 3 and that the trip latch assembly 70 will also be in the latched condition, as shown in FIG. 5, with the cam member 50 also in the position shown in FIG. 5. As also shown in FIG. 5, the toggle linkage 20 is in the collapsed condition with the operating levers 32, 34 and 36 in their respective positions corresponding to the open circuit position of the complete circuit breaker in which the operating mechanism is employed.

Assuming that the closing spring 42 is fully charged and that the operating mechanism is to be actuated to move the operating levers 32, 34 and 36 to their respective positions corresponding to the closed circuit position of the complete circuit breaker in which the operating mechanism is employed, the closing trigger 110 shown in FIG. 3 is actuated upwardly by any suitable means such as the plunger of a closing solenoid (not shown) to rotate in a clockwise direction about the pivot pin 128 and release the closing latch member 112 which will then rotate in a counterclockwise direction about the pivot shaft 118 to release the roller 66 on the ratchet wheel 54. The roller 66 on the ratchet wheel 54 and the crank arm 28A on the crankshaft 28 will rotate rapidly in a counterclockwise direction from their respective positions shown in FIG. 3, as the energy stored in the closing spring 42 is discharged, until the roler 66 reaches the position indicated in phantom at 66′ in FIG. 3 and the crank arm 28A is rotated by an angle of approximately 180° about the center 28C of the crankshaft 28 from the position shown in FIG. 3. While the closing spring 42 is discharging the energy stored therein, the cam member 50 which is also mounted on the crankshaft 28 will be rotated in a counterclockwise direction about the crankshaft 28 from the initial position shown in FIG. 5 to the final position shown in FIG. 6 when the closing spring is fully or substantially discharged. As the cam member 50 rotates in a counterclockwise direction from the initial position shown in FIG. 5, the increasing lobe portion 50A of the cam member 50 will first engage or bear against the roller 82 at the knee of the toggle linkage 20 and drive the roller 82 generally upwardly to thereby extend the toggle linkage 20 until the toggle linkage 20 reaches its fully extended position shown in FIG. 6 to thereby rotate the operating lever 34 and the trip-free shaft 24 in a counterclockwise direction. Since the outer operating levers 32 and 36 are also secured to the shaft 24, the latter operating levers will also be driven in a counterclockwise direction to actuate the operating members 48 which are coupled to said operating levers to move the associated movable contact members (not shown) of the complete circuit breaker in which the operating mechanism is employed to the closed circuit position.

Assuming that the complete circuit breaker in which the operating mechanism is employed is now in the closed circuit position and that the closing spring 42 is discharged with the closing latch assembly 100 in the released condition, the closing spring 42 may now be charged by energizing the motor 52 as previously described while the contacts and the other parts of the operating mechanism of the complete circuit breaker remain in the closed circuit position. As shown in FIG. 6, the trip latch assembly 70 will be in the latched condition and the cam member 50 will bear against the roller 82 to maintain the toggle linkage 20 in the extended condition. If the motor 52 is now energized to charge the closing spring 42, the ratchet wheel 54 will be rotated in a counterclockwise direction as previously described and the cam member 50 will rotate also in a counterclockwise direction with the constant radius portion 50B of the cam member 50 serving the important function of maintaining the toggle linkage 20 in an extended condition until the cam member 50 reaches the final position shown in FIG. 4 which corresponds to the fully charged condition of the closing spring 42. In other words, the closing spring 42 can be charged by the motor 52 through the ratchet mechanism 30 independently of the position, either open circuit or closed circuit, of the complete circuit breaker in which the operating mechanism is employed, since the cam member 50 will maintain the toggle linkage 20 in the extended position corresponding to the closed circuit position of the complete circuit breaker while the closing spring 42 is being charged as just described. A separate latch is not required to maintain the toggle linkage 20 extended while the closing spring 42 is being charged. This means that the cam member 50 does not have to raise the roller 82 at the knee of the toggle linkage 20 higher than the surface of the separate latch which would otherwise be required and the additional travel of the operating levers 32, 34, 36 and the associated movable contacts (not shown) which would otherwise be required is also eliminated. It is also important to note that the opening spring 62 is charged during a closing operation of the operating mechanism as disclosed, since the opening spring 62 is stretched and held in tension when the toggle linkage 20 is extended by the cam member 50 as the energy stored in the closing spring 42 is discharged.

In describing the tripping or opening operation of the disclosed operating mechanism, it is important to note that when the operating mechanism is in the operating condition which corresponds to the closed circuit position of the complete circuit breaker in which the operating mechanism is employed, the lower toggle link 164 is held in tension during the entire period of time in which the closing spring 42 is discharging and driving the cam member 50 to extend the toggle linkage 20 from the collapsed condition, shown in FIG. 5, to the extended condition, shown in FIGS. 6 and 7. Assuming that the operating mechanism is in the operating condition which corresponds to the closed circuit condition of the complete circuit breaker in which the operating mechanism is employed, the trip latch assembly 70 can be released by actuating the tripping trigger 72 in an upward direction by any suitable means, such as the plunger of a tripping solenoid (not shown) or by any manually actuated member which actuates the tripping trigger 72 in an upward direction to rotate in a clockwise direction about the pivot pin 71. When the tripping trigger 72 is actuated in an upward direction, the roller 73 of the left end of the rocker arm 76 rolls into the recess portion 87 of the tripping trigger 72 and the left end of the rocker arm 76 rotates in a counterclockwise direction about the pivot pin 77. When the left end of the rocker arm 76 is free to rotate in a counterclockwise direction, the right end of the rocker arm 76 at the roller 75 will be pushed in an upward direction or counterclockwise direction by the force of the opening spring 62 acting through the toggle linkage 20 and the cam link 172 to thereby disengage the roller 75 from the shoulder portion 172A of the cam link 172 which frees the cam link 172 for counterclockwise rotation about the pivot pin 174, as shown in FIG. 7. When the cam link 172 is freed for counterclockwise rotation, the toggle linkage 20 will collapse with the roller 82 at the knee of the toggle linkage 20 moving to the right, as shown in FIG. 7, and the operating levers 32, 34 and 36 will be actuated along with the trip-free shaft 24 to rotate in a clockwise direction about the center of the trip-free shaft 24. The movable contacts (not shown) of the complete circuit breaker in which the operating mechanism is employed will also be actuated to the open circuit position by the clockwise movement of the operating levers 32, 34 and 36 acting through the operating members 48 shown in FIG. 1. The trip latch assembly 70 will be reset from the released condition, shown in FIG. 7, to the latched condition shown in FIG. 5 by the charging of the closing spring 42 which will rotate the cam member 50 to position the recessed portion 50C adjacent to the roller 82 at the knee of the toggle linkage 20 which will then move to the left under the influence of the force of the resetting spring 184, as previously described. It is important to note that whenever the trip latch assembly 70 is in the released condition as shown in FIG. 7, the toggle linkage 20 will be incapable of transmitting thrust or force from the closing spring 42 through the crankshaft 28 and the cam member 50 to the operating levers 32, 34 and 36. This is because the pivoted connection between the lower toggle link 164 and the cam link 172 at the pivot pin 178 will not be held in a relatively stationary position by the trip latch assembly 70. The bumper or stop member 114 shown in FIGS. 4 through 7 is mounted on the frame 16 to prevent overtravel of the roller 82 at the knee of the toggle linkage 20 during a tripping or opening operation of the operating mechanism as just described and to assist in absorbing any excess energy in the operating mechanism which is discharged during the opening or tripping operation.

The operating mechanism as disclosed is trip-free during any closing operation since the lower toggle link 164 is held in tension during the entire closing operation of the operating mechanism, as previously described. Since the lower toggle link 164 is held under tension during a closing operation, the lower toggle link 164 tends to rotate the cam link 172 in a counterclockwise direction about the pivot pin 174. When the tripping trigger 72 is actuated in an upward direction or in a clockwise direction about the pivot pin 71, the cam link 172 will rotate in a counterclockwise direction to collapse the toggle linkage 20 whenever the tripping trigger 72 is actuated in an upward direction by any suitable means, such as the plunger of a tripping solenoid. Whenever the toggle linkage is collapsed and the trip latch assembly 70 is released as shown in FIG. 7, the toggle linkage 20 is incapable of transmitting any closing thrust or force to the operating levers 32, 34 and 36 as previously explained in detail. The operating mechanism as disclosed therefore is completely trip-free during any closing operation independently of the condition of the closing latch assembly 100 or the discharge of the closing spring 42.

In order to permit manual charging of the closing spring 42, at least one end of the crankshaft 28 is formed to have a hexagonal cross-section and to extend beyond one end of the frame 16 as shown in FIGS. 1 and 2 and as indicated at 28B to receive a suitable wrench, such as a socket wrench, to permit manual rotation of the crankshaft 28 and charging of the closing spring 42 in cooperation with the ratchet mechanism 30. In order to permit manual movement of the operating levers 32, 34 and 36 to operating positions which correspond to the closed circuit position of the complete circuit breaker in which the operating mechanism is employed, a maintenance closing lever (not shown) may be inserted into the receptacle 38 shown in FIGS. 1 and 2, said receptacle being secured or formed as part of the operating lever 36 to manually rotate the trip-free shaft 24 directly rather than through the operation of the electrically operated motor 52 and the closing spring 42. In order to prevent the movement of the complete circuit breaker in which the operating mechanism is employed into or out of an associated enclosing housing (not shown), an interlocking member may be secured to the trip-free shaft 24, as indicated at 146, by the bolt 144 to engage an associated levering-in mechanism (not shown) whenever the operating mechanism is in the operating condition which corresponds to the closed circuit position of the complete circuit breaker in which the operating mechanism is employed.

It is to be understood that the teachings of the invention disclosed may be applied to other types of circuit breakers and interrupts rather than those of relatively large size or of relatively higher voltage ratings as disclosed. It is also to be understood that the teachings of the invention may be applied to circuit breakers which may be either of the single-phase type or of the three-phase or polyphase type as disclosed.

The apparatus embodying the teachings of this invention has several advantages. For example, the operating mechanism as disclosed requires fewer parts than previous operating mechanisms of the same general type and requires a shorter time to operate. In addition, the operating mechanism as disclosed does not require a separate latching member to maintain the operating mechanism in the closed condition while the closing spring is being charged. Further, when the operating mechanism is in the operating condition which corresponds to the closed circuit condition of the circuit breaker in which it is employed and the closing spring is charged, the operating mechanism is capable of rapid or closely successive opening, closing and opening operations before the closing spring need be recharged. Finally, less travel is required of the operating parts and provision is not required to accommodate overtravel of various parts which might otherwise be required in previously employed operating mechanisms of the same general type.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A stored energy mechanism for actuating the contacts of a circuit breaker comprising fixed support means, an operating shaft mounted on said support means, one or more operating members secured to said shaft, operating means for coupling said operating members to said contacts, trip latch means, toggle means for connecting said trip latch means to at least one of said operating members, a crankshaft mounted on said support means, a closing spring operatively connected to said crankshaft, means for driving said crankshaft to charge said closing spring, releasable means for retaining said closing spring in a charged condition, and cam means driven by said crankshaft for extending said toggle means when said releasable means is released to rotate said operating shaft and to actuate said operating means, said cam means being shaped to maintain said toggle means in the extended condition while said driving means drives said crankshaft to charge said closing spring.

2. A stored energy mechanism for actuating the contacts of a circuit breaker comprising fixed support means, an operating shaft mounted on said support means, one or more operating members secured to said shaft, operating means for coupling said operating members to said contacts, trip latch means, toggle means for connecting said trip latch means to at least one of said operating members, a crankshaft mounted on said support means, a closing spring operatively connected to said crankshaft, means for driving said crankshaft to charge said closing spring, releasable means for retaining said closing spring in a charged condition, and cam means driven by said crankshaft for extending said toggle means from a first operating position to a second operating position which is on the same side of a line extending between the ends of the toggle means as the first operating position when said releasable means is released to rotate said operating shaft and to actuate said operating means, said cam means being shaped to maintain said toggle means in the extended condition while said driving means drives said crankshaft to charge said closing spring.

3. A stored energy mechanism for actuating the contact members of a circuit breaker comprising fixed support means, an operating shaft rotatably mounted on said support means, one or more operating levers secured to said shaft, operating means for coupling said levers to said contact members, a closing spring, a crankshaft mounted on said support means, a ratchet wheel secured to sid crankshaft, a pivoted actuator for driving the ratchet wheel and the crankshaft to charge the closing spring, means connected to said actuator for oscillating the actuator to charge the closing spring, closing latch means disposed to releasably prevent rotation of said ratchet wheel and to maintain said closing spring in a charged condition, tripping latch means, toggle means connected between said tripping latch means and one of said operating levers, and cam means driven by said crankshaft to extend said toggle means to rotate said operating shaft when the closing latch means is released to release the energy stored in the spring and to maintain the toggle means to the extended condition while the ratchet wheel is driven to charge the closing spring.

4. A stored energy mechanism for actuating the contact members of a circuit breaker comprising fixed support means, an operating shaft rotatably mounted on said support means, one or more operating levers secured to said shaft, operating means for coupling said levers to said contact members, a closing spring, a crankshaft mounted on said support means, a ratchet wheel secured to said crankshaft, a pivoted actuator for driving the ratchet wheel and the crankshaft to charge the closing spring, means connected to said actuator for oscillating the actuator to charge the closing spring, closing latch means disposed to releasably prevent rotation of said ratchet wheel and to maintain said closing spring in the charged condition, tripping latch means, toggle means connected between said tripping latch means and one of said operating levers, and cam means driven by said crankshaft to extend said toggle means from a first operating position to a second operating position which is on the same side of a line extending between the ends of the toggle means as the first operating position to rotate said operating shaft when the closing latch means is released to release the energy stored in the spring and to maintain the toggle means to the extended condition while the ratchet wheel is driven to charge the closing spring.

5. A stored energy mechanism for actuating the contact members of a circuit breaker comprising a frame, a trip-free shaft rotatably mounted in the frame, one or more operating levers secured to the shaft, operating means for connecting said levers to the contact members of said circuit breaker, a closing spring, a crankshaft rotatably mounted in the frame, a ratchet wheel secured to the crankshaft, a pivoted actuator for driving the ratchet wheel and the crankshaft to charge the spring, a motor for oscillating the actuator to charge the spring, closing latch means for releasably retaining the closing spring in the charged condition, tripping latch means, toggle means connected between the tripping latch means and one of the operating levers on the trip-free shaft, and cam means driven by the crankshaft to extend the toggle means to thereby rotate the trip-free shaft when the closing latch means is released to release the energy stored in said spring and to retain the toggle means in the extended condition while said ratchet wheel is being driven to charge the closing spring.

6. A stored energy mechanism for actuating the contacts of a circuit breaker comprising fixed support means, an operating shaft mounted on said support means, one or more operating members secured to said shaft, operating means for coupling said operating members to said contacts, trip latch means, toggle means for connecting said trip latch means to at least one of said operating members, a crankshaft mounted on said support means, a closing spring operatively connected to said crankshaft, means for driving said crankshaft to charge said closing spring, releasable means for retaining said closing spring in a charged condition, an opening spring operatively connected to said operating shaft and cam means driven by said crankshaft for extending said toggle means when said releasable means is released to rotate said operating shaft and to actuate said operating means, said opening spring being charged when said releasable means is released to rotate said operating shaft, said cam means including a portion to maintain said toggle means in the extended condition while said driving means drives said crankshaft to charge said closing spring.

7. A stored energy mechanism for actuating a load between first and second predetermined positions comprising an operating shaft, fixed means for rotatably supporting said operating shaft, one or more operating members secured to said operating shaft, means for coupling said operating members to said load, first releasable latch means, toggle means for connecting said latch means to at least one of said operating members, a crankshaft mounted on said fixed means, an operating spring operatively connected to said crankshaft, means for driving said crankshaft to charge said spring, second releasable latch means for retaining said spring in the charged condition, and cam means driven by said crankshaft for extending said toggle means when said second latch means is released to rotate said operating shaft to thereby actuate said load to one of said predetermined positions, said toggle means being maintained in the extended condition by said cam means while the spring is charged by said driving means.

8. A stored energy mechanism for actuating a load between first and second predetermined positions comprising an operating shaft, fixed means for rotatably supporting said operating shaft, one or more operating members secured to said operating shaft, means for coupling said operating members to said load, first releasable latch means, toggle means for connecting said latch means to at least one of said operating members, a crankshaft mounted on said fixed means, an operating spring operatively connected to said crankshaft, means for driving said crankshaft to charge said spring, second releasable latch means for retaining said spring in the charged condition, and cam means driven by said crankshaft for extending said toggle means from a first position to a second position which is on the same side of a line extending between the ends of the toggle means as the first operating position when said second latch means is released to rotate said operating shaft to thereby actuate said load to one of said predetermined positions, said toggle means being maintained in the extended condition by said cam means while the spring is charged by said driving means, said first latch means being releasable to permit the collapse of said toggle means and to prevent said cam means from rotating said operating shaft.

References Cited by the Examiner

UNITED STATES PATENTS

| | | | |
|---|---|---|---|
| 2,829,737 | 4/1958 | Favre | 185—37 |
| 3,097,275 | 7/1963 | Wiktor | 200—153 X |
| 3,183,332 | 5/1965 | Frink et al. | 185—37 X |

ROBERT S. MACON, *Acting Primary Examiner.*

ROBERT K. SCHAEFER, KATHLEEN H. CLAFFY, W. C. GARVERT, *Assistant Examiners.*